US012603816B2

(12) United States Patent
Agcaoili

(10) Patent No.: US 12,603,816 B2
(45) Date of Patent: Apr. 14, 2026

(54) SYSTEM AND METHOD FOR IMPLEMENTING PARALLEL SOFTWARE INSTANCES IN O-RAN IN A CELLULAR NETWORK

(71) Applicant: DISH Wireless L.L.C., Englewood, CO (US)

(72) Inventor: Arnold Foronda Agcaoili, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 7 days.

(21) Appl. No.: 18/769,157

(22) Filed: Jul. 10, 2024

(65) Prior Publication Data

US 2026/0019336 A1 Jan. 15, 2026

(51) Int. Cl.
*G06F 13/00* (2006.01)
*H04L 41/0806* (2022.01)
*H04L 41/0895* (2022.01)

(52) U.S. Cl.
CPC ...... *H04L 41/0895* (2022.05); *H04L 41/0806* (2013.01)

(58) Field of Classification Search
CPC .......................... H04L 41/0895; H04L 41/0806

USPC .......................................... 709/220–222, 201
See application file for complete search history.

(56) References Cited

U.S. PATENT DOCUMENTS

| | | | | |
|---|---|---|---|---|
| 11,889,508 B1 * | 1/2024 | Anderson | ............. | H04W 72/21 |
| 12,501,281 B2 * | 12/2025 | Singhal | ............... | H04L 41/0897 |
| 2023/0063162 A1 * | 3/2023 | Singhal | ............... | H04L 41/0897 |
| 2025/0048387 A1 * | 2/2025 | Liu | ..................... | H04W 72/232 |

* cited by examiner

*Primary Examiner* — Kenneth R Coulter
(74) *Attorney, Agent, or Firm* — Seed Intellectual Property Law Group LLP

(57) ABSTRACT

Systems and methods for implementing parallel software instances in Open Radio Access Network (O-RAN) with disaggregated hardware and software in a cellular network are disclosed. One such method includes: initiating a first instance of a DU of a RAN on a first portion of a plurality of core processors in the cellular network; initiating a second instance of the DU of the RAN on a second portion of the plurality of core processors in the cellular network, wherein the first portion of the plurality of core processors is distinct from the second portion of the plurality of core processors; running the first instance of the DU of the RAN concurrently with the second instance of the DU of the RAN in the cellular network; and swapping the active instance from the first instance of the DU of the RAN with the second instance of the DU of the RAN.

20 Claims, 7 Drawing Sheets

SYSTEM AND METHOD FOR IMPLEMENTING PARALLEL SOFTWARE INSTANCES IN O-RAN IN A CELLULAR NETWORK

BACKGROUND

Radio Access Technology (RAN) is a segment in a cellular network. For example, RAN is the final link between a network and a phone. RAN includes equipment such as antennas that are visible on towers, as well as the associated base stations. RAN interconnects end devices (i.e., User Equipment (UEs)) such as mobile phones, tablets, computers, or Internet of Things (IoT) machines to each other, as well as to services through a mobile packet core. Open Radio Access Network (ORAN) is version of the Radio Access Network (RAN) system that enables interoperation between cellular telecommunications equipment provided by different vendors. This is achieved by using interoperable interfaces and virtualization. Virtualization within ORAN enables hardware and software to be disaggregated from each other. Thus, when ORAN is deployed, service providers are not locked into a single solution, and vendor lock-in is avoided. In this manner, service providers are to choose their own components based on their specific needs. Therefore, ORAN provides greater overall flexibility.

ORAN includes all different parts of computer system architecture, e.g., computer hardware, software functions, and the radio unit (RU). In an ORAN environment, the RAN is disaggregated into three main building blocks: the Radio Unit (RU), the Distributed Unit (DU), and the Centralized Unit (CU). Radio frequency signals are transmitted, received, amplified, and digitized by the RU, which is located near (or integrated into) the antenna. The DU and CU are the computation parts of the base station that send the digitalized radio signal into the network. The DU is physically located at or near the RU whereas the CU can be located nearer the Core. Notably, ORAN "opens" the protocols and interfaces between the building blocks (hardware, software, and radios) in the RAN.

VMware virtualizes physical computers using a thin layer of software that interacts with the underlying resources of a physical computer and allocates those resources to other operating systems. The physical computer is referred to as the host, and the other operating systems are referred to as guests.

As the use of smartphones and Internet of Things (IoT) devices has increased, so too has the desire for more reliable, fast, and continuous transmission of content. In an effort to improve the content transmission, networks continue to improve with faster speeds and increased bandwidth. The advent and implementation of fifth-generation (5G) wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

BRIEF SUMMARY

The present disclosure relates generally to telecommunication networks, more particularly, to the System and Method of implementing parallel software instances in O-RAN in a cellular network.

Briefly stated, one or more methods of implementing parallel software instances in O-RAN in a cellular network are disclosed. Some such methods include: initiating a first instance of a Distributed Unit (DU) of a Radio Access Network (RAN) on a first portion of a plurality of core processors in the cellular network; initiating a second instance of the DU of the RAN on a second portion of the plurality of core processors, wherein the first portion of the plurality of core processors is distinct from the second portion of the plurality of core processors in the cellular network; running the first instance of the DU of the RAN on the first portion of the plurality of core processors concurrently with the second instance of the DU of the RAN on the second portion of the plurality of core processors; and swapping an active instance from the first instance of the DU of the RAN on the first portion of the plurality of core processors with the second instance of the DU of the RAN on the second portion of the plurality of core processors.

In some embodiments of the method for implementing parallel software instances in O-RAN in a cellular network, the first instance is a first operating system and the second instance is a second operating system. In another aspect of some embodiments, the first instance is a first version of software from a first vendor and the second instance is a second version of the software from the same first vendor. In still another aspect of some embodiments, the first instance is a first software from a first vendor and the second instance is a second software from a second vendor. In yet another aspect of some embodiments, the first instance is a 5G cellular network operating system and the second instance is a 6G cellular network operating system.

In one or more embodiments of the method for implementing parallel software instances in O-RAN in a cellular network, the first instance is a first virtual machine and the second instance is a second virtual machine. In another aspect of some embodiments, the first instance is a Windows operating system and the second instance is a Linux operating system. In still another aspect of some embodiments, the first instance is a virtual machine and the second instance is an edge computing platform.

In other embodiments, one or more systems for implementing parallel software instances in Open Radio Access Network (O-RAN) with disaggregated hardware and software in a cellular network are disclosed. The system includes a memory that stores computer-executable instructions; and a processor that executes the computer-executable instructions that cause the processor to: initiate a first instance of a Distributed Unit (DU) of a Radio Access Network (RAN) on a first portion of a plurality of core processors in the cellular network; initiate a second instance of the DU of the RAN on a second portion of the plurality of core processors, wherein the first portion of the plurality of core processors is distinct from the second portion of the plurality of core processors in the cellular network; run the first instance of the DU of the RAN on the first portion of the plurality of core processors concurrently with the second instance of the DU of the RAN on the second portion of the plurality of core processors; and swap an active instance from the first instance of the DU of the RAN on the first portion of the plurality of core processors with the second instance of the DU of the RAN on the second portion of the plurality of core processors.

In some embodiments of the system for implementing parallel software instances in O-RAN in a cellular network, the first instance is a first operating system and the second instance is a second operating system. In another aspect of some embodiments, the first instance is a first version of a software from a first vendor and the second instance is a second version of the software from the same first vendor. In still another aspect of some embodiments, the first instance is a first software from a first vendor and the second instance is a second software from a second vendor. In yet another aspect of some embodiments, the first instance is a 5G cellular network operating system and the second instance is a 6G cellular network operating system.

In one or more embodiments of the system for implementing parallel software instances in O-RAN in a cellular network, the first instance is a first virtual machine and the second instance is a second virtual machine. In another aspect of some embodiments, the first instance is a Windows operating system and the second instance is a Linux operating system. In still another aspect of some embodiments, the first instance is a virtual machine and the second instance is an edge computing platform.

In other embodiments, one or more systems for implementing parallel software instances in Open Radio Access Network (O-RAN) with disaggregated hardware and software in a cellular network are disclosed. The system includes a memory that stores computer-executable instructions; and a processor that executes the computer-executable instructions that cause the processor to: enable initiation of a first instance of a Distributed Unit (DU) of a RAN on a first portion of a plurality of core processors in a cellular network; enable initiation of a second instance of the DU of the RAN on a second portion of the plurality of core processors, wherein the first portion of the plurality of core processors is distinct from the second portion of the plurality of core processors in the cellular network; execute the first instance of the DU of the RAN on the first portion of the plurality of core processors concurrently with the second instance of the DU of the RAN on the second portion of the plurality of core processors; and selectively enable a user to access one or more of the first instance of the DU of the RAN on the first portion of the plurality of core processors, and the second instance of the DU of the RAN on the second portion of the plurality of core processors.

In some embodiments of the system for implementing parallel software instances in O-RAN in a cellular network, the first instance is a first operating system and the second instance is a second operating system. In another aspect of some embodiments, the first instance is a first version of a software from a first vendor and the second instance is a second version of the software from the same first vendor. In still another aspect of some embodiments, the first instance is a first software from a first vendor and the second instance is a second software from a second vendor. In yet another aspect of some embodiments, the first instance is a 5G cellular network operating system and the second instance is a 6G cellular network operating system.

In one or more embodiments of the system for implementing parallel software instances in O-RAN in a cellular network, the first instance is a first virtual machine and the second instance is a second virtual machine. In another aspect of some embodiments, the first instance is a Windows operating system and the second instance is a Linux operating system. In still another aspect of some embodiments, the first instance is a virtual machine and the second instance is an edge computing platform.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the disclosed invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

5G architecture provides an environment in which the system for implementing parallel software instances in O-RAN in a cellular network may be implemented. The following paragraphs disclose some 5G concepts and elements that support implementing parallel software instances in O-RAN in a cellular network, which will be further described below with reference to FIG. 1-7.

Figure 1:
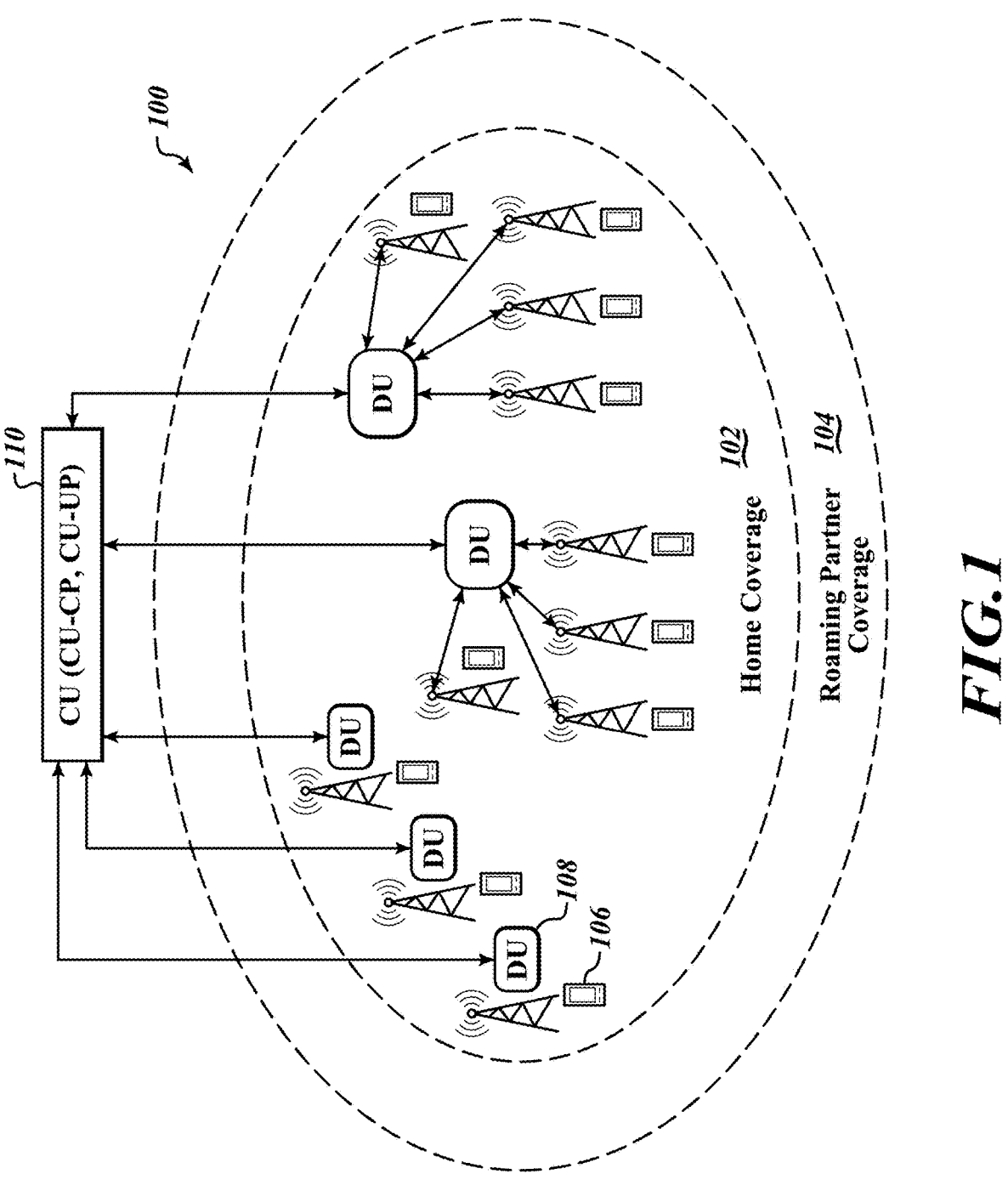
FIG. 1 illustrates a context diagram of a 5G network, which may be implemented in accordance with embodiments described herein.
Figure 2:
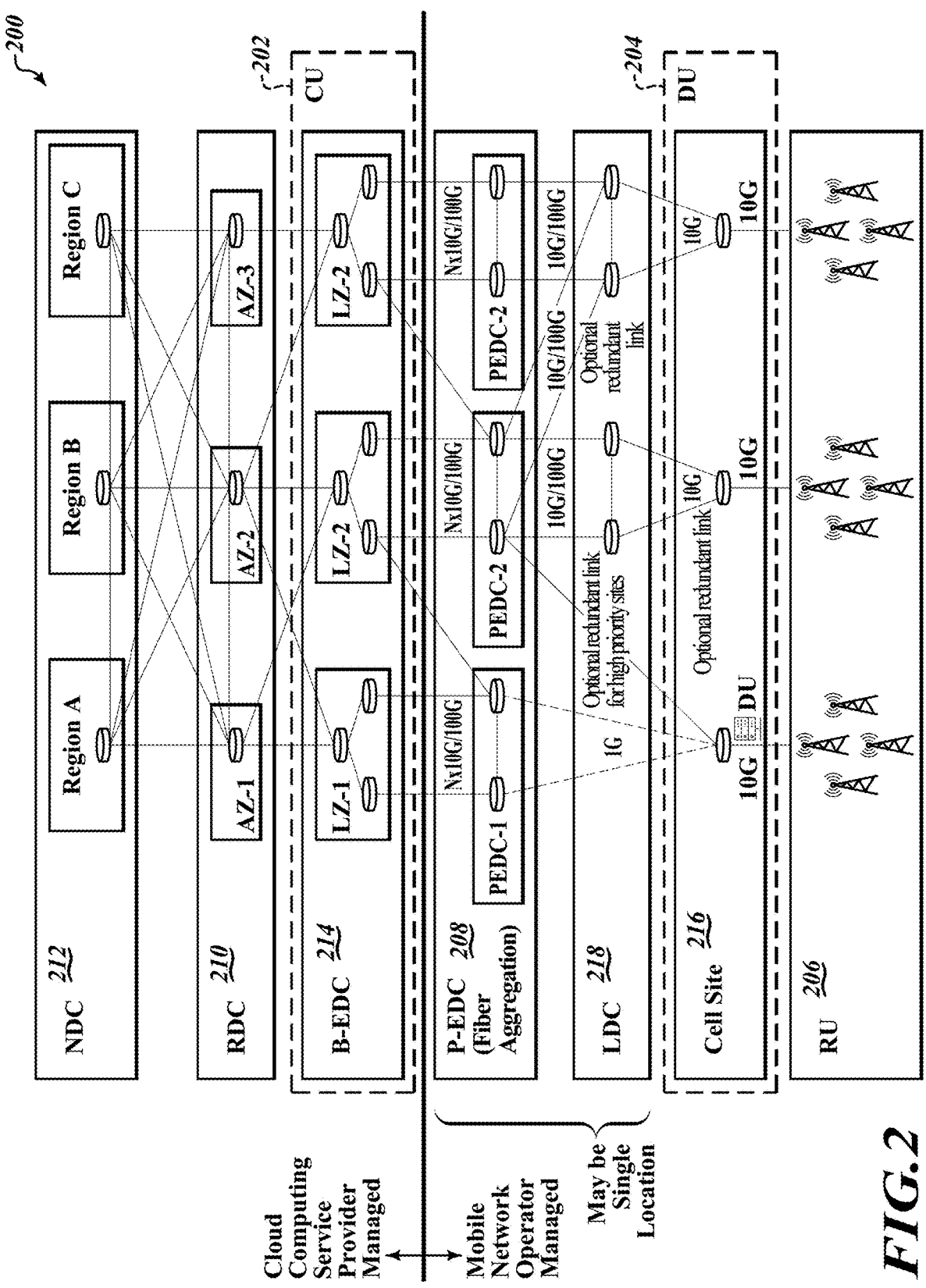
FIG. 2 illustrates a diagram of an example system architecture overview of a system in which the environment of FIG. 1 may be implemented in accordance with embodiments described herein.
Figure 3:
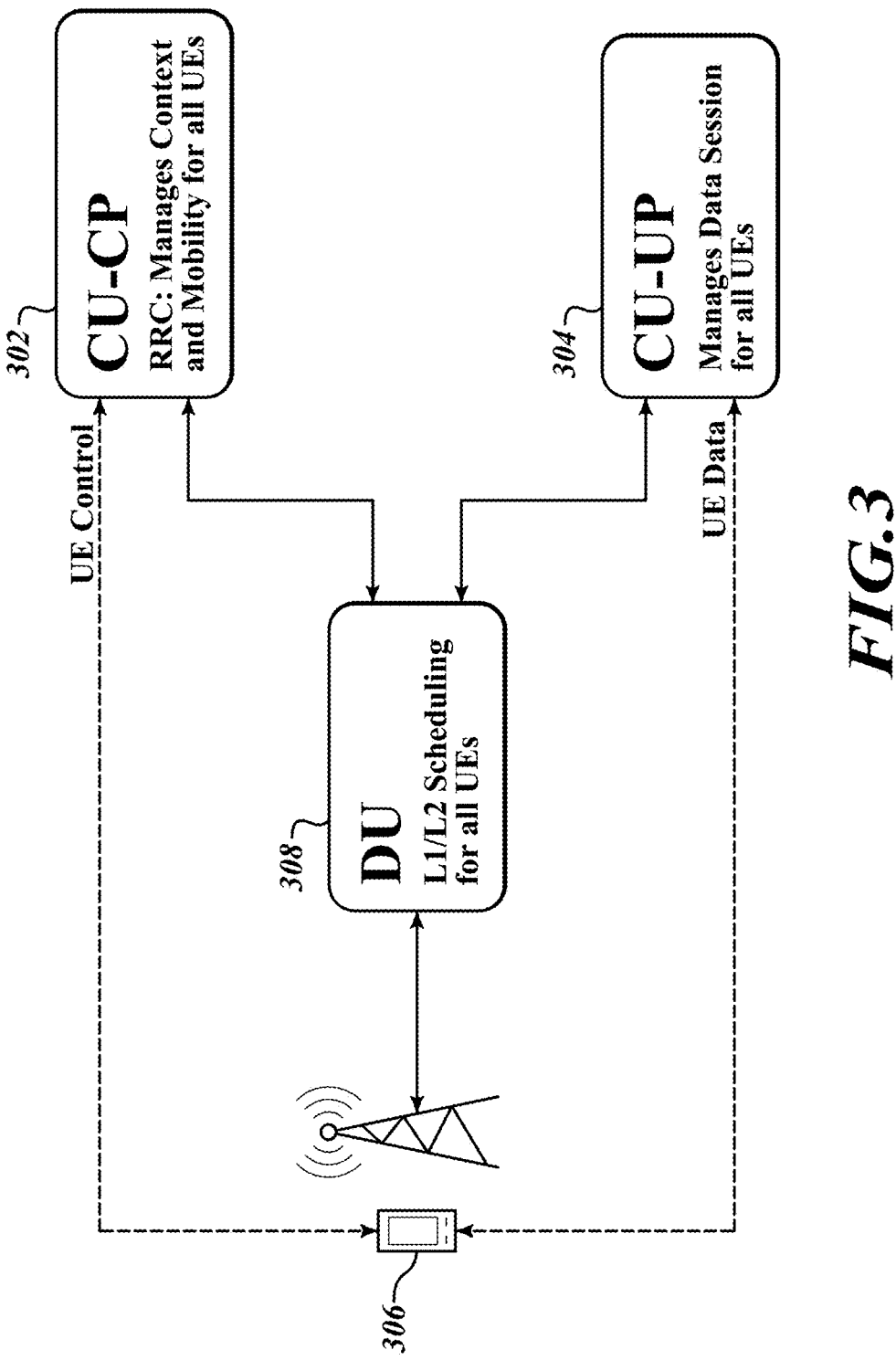
FIG. 3 illustrates a diagram showing connectivity between certain telecommunication network components during cellular telecommunication.

FIGS. 1-3 illustrate various aspects of a 5G environment that is described below with respect to a system for implementing parallel software instances in O-RAN in a cellular network. For example, FIG. 1 illustrates a context diagram of connects between various towers, DUs (Distributed Units), CUs (Centralized Units), and UEs (User Equipment). FIG. 2 illustrates a diagram of an example system architecture overview that includes an NDC (National Data Center), RDC (Regional Data Center), B-EDC (Breakout Edge Data Centers), P-EDC (Passthrough Edge Data Centers), LDC (Local Data Center), cell sites, and RUs (Radio Units). FIG. 3 illustrates a diagram showing UE controls for managing context and mobility for UEs and UE data for managing data session of UEs.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual O-RAN with interfaces creating additional data access points.

5G network functions may be completely software-based and designed as cloud-native, meaning that they are agnostic to the underlying cloud infrastructure, allowing higher deployment agility and flexibility. 5G Core establishes reliable, secure connectivity to the network for end users and provides access to its services. 5G Core handles mobile network functions including connectivity, mobility management, authentication, subscriber data management, and policy management. 5G Core network functions are software-based and cloud-native, such that they may be used with various underlying cloud infrastructures.

With the advent of 5G, industry experts defined how the 5G Core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in telecommunications that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

A virtual private cloud (VPC) is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user. In some embodiments, this 5G network leverages the distributed nature of 5G cloud-native network functions and cloud flexibility, which optimizes the placement of 5G network functions for optimal performance based on latency, throughput and processing requirements.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility and provides open interfaces and open-source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

Open RAN disaggregates traditional monolithic, single-vendor radio access networks (RAN) into a distributed unit (DU), centralized unit (CU) and radio unit (RU) and connects these elements using open standard interfaces. Disaggregation allows the operator to virtualize the CU and DU components and run them on commercial off the shelf (COTS) servers using a fully virtualized, cloud-native Open RAN network.

Open RAN puts the mobile network operator (MNO) in control of their network with more transparency, technology choice and competition, resulting in lower costs and more agile networks. Open RAN constitutes a radical transformation of the RAN technology with a new Open RAN architecture and a broad and deep Open RAN ecosystem of companies that provide new Open RAN 4G and 5G networks that are flexible, cost-effective and innovative.

Open RAN is a revolutionary new way to build a 5G mobile network that reduces total cost of deployment, provides operational simplicity, and increases velocity of new feature rollouts when concepts of cloud are effectively used. An Open RAN solution also increases flexibility and innovation in the network.

The RAN provides wireless connectivity to mobile users, providing connectivity and converts radio frequency (RF) signals into digital packets and vice versa. Until Open RAN, the RAN was a monolithic system bought from a single vendor and not very flexible. Thus, O-RAN enables multiple vendors to be employed in parallel.

A key concept in the Open RAN architecture is to disaggregate the monolithic RAN into its core elements and then create open standards for all the interfaces to connect the different elements of the RAN. The baseband unit (BBU) became the distributed unit (DU) and the centralized unit (CU). The radio unit (RU) is connected to the DU through an open interface. In this way Open RAN networks can be built using interchangeable systems from a competitive Open RAN ecosystem.

Open RAN architecture enables use of virtualization to disaggregate a standard RAN into several systems that run on COTS servers and are connected by open networking interfaces. Open RAN solutions are set apart by the following features: Virtualization/containerization, Disaggregation, Open Interfaces, and Automation. Regarding the Virtualization/containerization, Open RAN architecture replaces the need for proprietary hardware by virtualizing RAN functions so they can run on x86-based COTS servers. This dramatically reduces the cost and increases the flexibility of the system. Open RAN ecosystem partners are shifting from virtualization to containerization to provide even better scalability. Regarding Disaggregation, the Open RAN architecture breaks the BBU into an RU, DU and CU. This enables virtualization of the DU and CU, cost-effective deployment and management, and a proven approach to Open RAN security for cloud-native networks. Open RAN also disaggregates the system hardware from the system software, which enables components from different vendors to be able to be used together.

Regarding Open Interfaces, in some embodiments, there are 11 different interfaces within the RAN. The Open RAN architecture provides industry-wide standards for RAN interfaces, as defined by O-RAN ALLIANCE, that support interoperation between vendors, thereby allowing for a diverse Open RAN ecosystem. Finally, regarding the concept of automation, Open RAN architecture enables interoperation with edge cloud platform providers for advanced configuration, deployment and life cycle management. Additionally, zero-touch deployment is a requirement of Open RAN for managing a network composed of many thousands of small cell base stations.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

Referring again to FIG. 1, this figure illustrates a context diagram of an environment for a system for implementing parallel software instances in O-RAN in a cellular network, in accordance with embodiments described herein. A given area 100 will mostly be covered by two or more mobile network operators' wireless networks. Generally, mobile network operators have some roaming agreements that allow users to roam from home network to partner network under certain conditions, shown in FIG. 1 as home network coverage area 102 and roaming partner network coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE will scan for a roaming network after a timer expiration (6 minutes, for example). This could have significant impact on customer experience in case of a catastrophic failure in the network. As shown in FIG. 1, a RAN is split into DUs (e.g., DU 108) that manage scheduling of all the users and a CU that manages the mobility and radio resource control (RRC) state for all the UEs. The RRC is a layer within the NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE.

FIG. 2 illustrates a diagram of an example system architecture overview 200 of a system for implementing parallel software instances in O-RAN in a cellular network in which the environment of FIG. 1 may be implemented in accordance with embodiments described herein. As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality. The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried.

The CU 202 is the centralized unit that runs the RRC and Packet Data Convergence Protocol (PDCP) layers. A RAN may comprise a CU and one DU connected to the CU via F1-C and F1-U interfaces for control plane (CP) and user plane (UP), respectively. A CU with multiple DUs will support multiple RAN. The split architecture enables a 5G network to utilize different distribution of protocol stacks between CU 202 and DU 204 depending on midhaul availability and network design. The CU 202 is a logical node that includes the RAN functions like transfer of user data, mobility control, RAN sharing, positioning, session management, etc., with the exception of functions that may be allocated exclusively to the DU 204. The CU 202 controls the operation of several DUs 204 over the mid-haul interface.

As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a breakout edge data center (B-EDC) 214. The DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

FIG. 3 is a diagram showing connectivity between certain telecommunication network components with respect to a system (e.g., a system for implementing parallel software instances in O-RAN in a cellular network). The central unit control plane (CU-CP) 302, for example, of CU 110 of FIG. 1 or CU 202 of FIG. 2, primarily manages control processing of DUs, such as DU 308, and UEs, such as UE 306. The CU-CP 302 hosts RRC and the control-plane part of the PDCP protocol. CU-CP 302 manages the mobility and radio resource control (RRC) state for all the UEs. The RRC is a layer within the NR protocol stack and manages context and mobility for all UEs. The behavior and functions of RRC are governed by the current state of RRC. RRC has three distinct states: RRC_IDLE, RRC_CONNECTED and RRC_INAC-TIVE. The CU-CP 302 terminates the E1 interface connected with the central unit user plane (CU-UP) 304 and the F1-C interface connected with the DU 308. The DU 308 maintains a constant heartbeat with CU-CP 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

Figure 4:
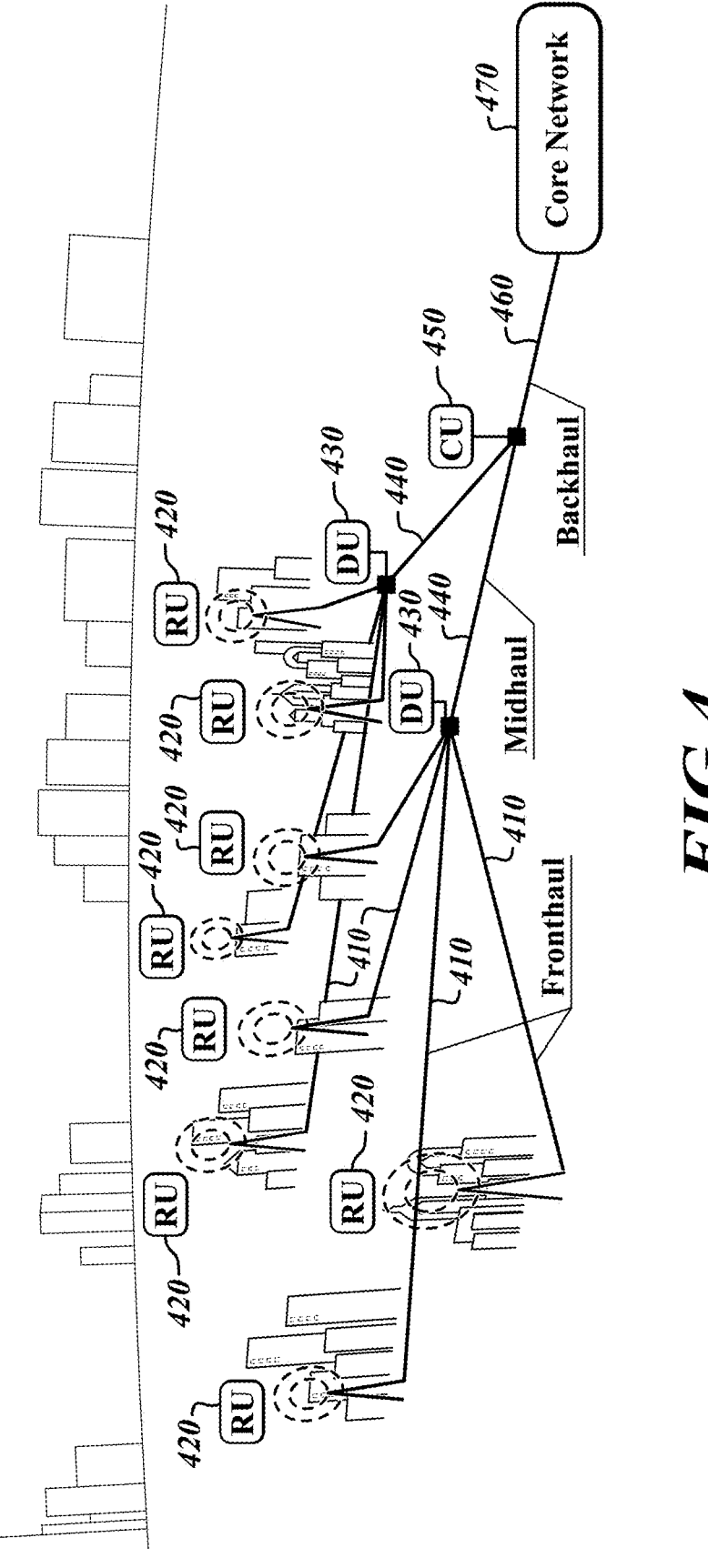
FIG. 4 illustrates a diagram showing a system for implementing parallel software instances in O-RAN in a cellular network.

Referring now to FIG. 4, the O-RAN ALLIANCE has defined different interfaces within the RAN including those for: (1) Fronthaul link 410 between the Radio Unit 420 and the Distributed Unit 430, (2) Midhaul link 440 between Distributed Unit 430 and the Centralized Unit 450, and (3) Backhaul link 460 between the Centralized Unit 450 and the Core Network 470. Notably, DU 108 from FIG. 1, DU 204 from FIG. 2, DU 308 from FIG. 3, and DU 430 from FIG. 4 may be used interchangeably and can refer to the same Distributed Units. The open and disaggregated architectures, software, and hardware of ORAN, provide operators with the flexibility to extend 5G to more users in an efficient and secure manner. The Fronthaul link 410, Midhaul link 440, and Backhaul link 460 may be composed of various transmission materials, such as optical fiber.

Figure 5:
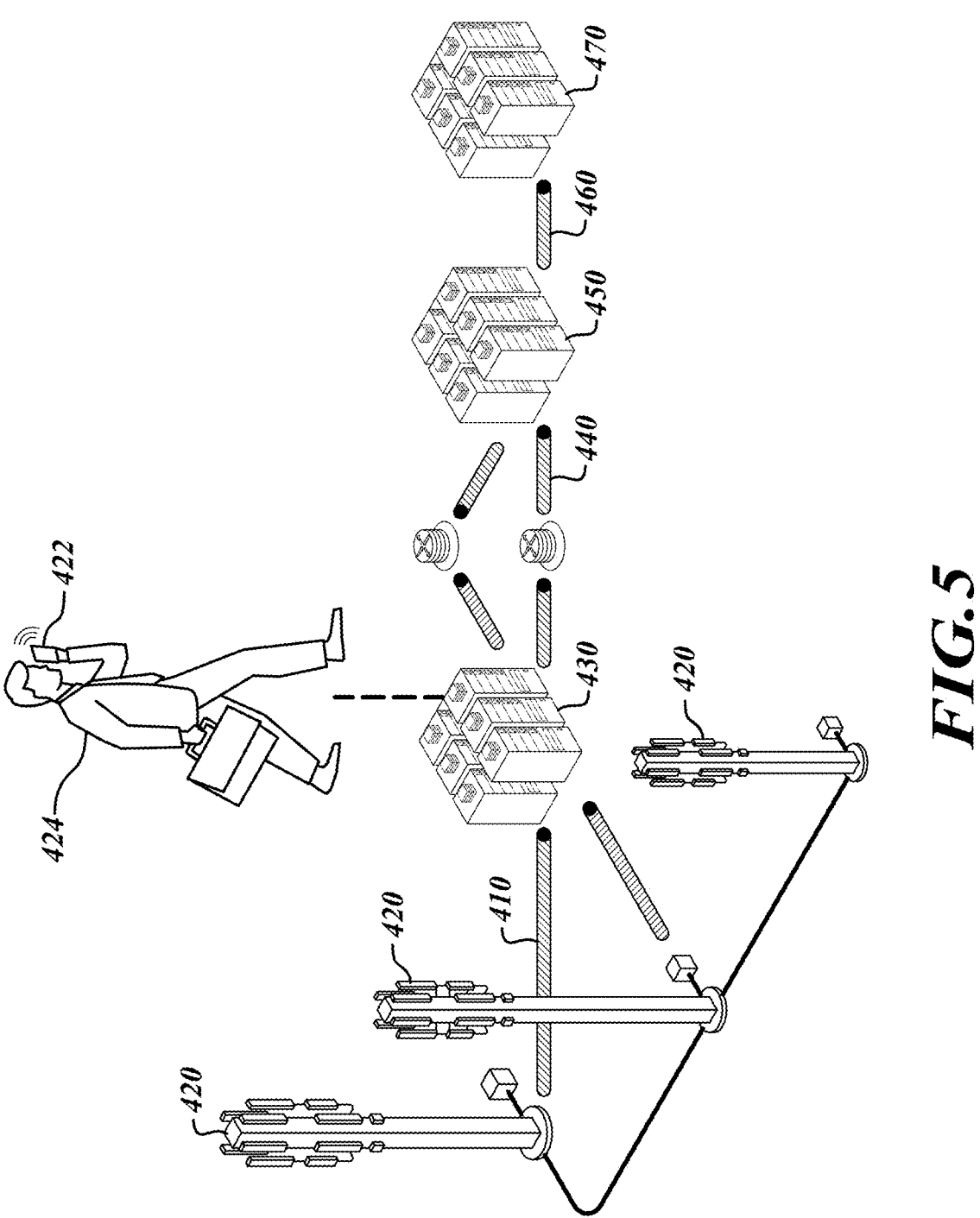
FIG. 5 illustrates a diagram showing a system for implementing parallel software instances in O-RAN in a cellular network.

Referring now to FIG. 5, an embodiment is shown of a system for implementing parallel software instances in Open Radio Access Network (O-RAN) with disaggregated hardware and software in a cellular network. The network includes multiple Radio Units (RUS) 420 that are connected wirelessly to User Equipment (UE) 422 that is being used by an end user 424. The Radio Units (RU) 420 are also connected to a Distributed Unit (DU) 430 by a Fronthaul link 410. The Distributed Unit (DU) 430 is then in turn connected by a Midhaul link 440 to a Centralized Unit (CU) 450. The Centralized Unit (CU) 550 may in turn be connected by a Backhaul link 460 to the Core Network 470. In some embodiments, the Core Network 470 is located in a Regional Data Center. In another aspect of some embodiments, the Distributed Unit (DU) 430 is located in an Edge Data Center.

According to embodiments of the system for implementing parallel software instances in O-RAN with disaggregated hardware and software in a cellular network, a cellular device User Equipment (UE) 422 may now maintain instances of two operating systems at the same time, such as one Windows Operating System and one Linex Operating System. Specifically, in one embodiment, these software instances of the two operating systems may be run in a cloud (e.g., a private cloud) on the Distributed Unit (DU) 430, while versions of the DU 430 are maintained on the UE 422 (e.g., a cellular device).

For example, in one embodiment, a VMware Virtual Machine only utilizes 16 cores of the 24 core processors (or 32 cores processors) to run an instance of the DU 430 on the hardware of a cloud server, which is maintained of the UE 422 (e.g., a cellular device). The additional 8 core processors (or 16 core processors) on the hardware of the cloud server may be used to run another instance of the DU 430, which is setup and maintained on the UE 422 (e.g., a cellular device). Otherwise stated, in one embodiment with 24 total core processors on the hardware of the cloud server, a first portion of the plurality of processors includes 16 core processors that do not share or overlap with the additional 8 core processors, i.e., the second portion of the plurality of core processors. Alternatively, in another embodiment with 32 total core processors on the hardware of the cloud server, a first portion of the plurality of processors includes 16 core processors (e.g., core processors 1-16) that do not share or overlap with the additional 16 core processors (e.g., core processors 17-32), which are the second portion of the plurality of core processors.

In various embodiments, there are multiple techniques for how the cores are selected or assigned to the DUs. In one technique that employs a cloud native approach, the cores are statically allocated to each instance. This is a more basis and sable approach, yet more limited approach to cores allocation. In another embodiment that employs a cloud native approach, the cores are dynamically allocated to each instance, depending on circumstances or preferences, for example, load balancing. Dynamic allocation of cores to each instance in an ORAN state provides the benefits of cloud technology.

Thus, a software update may be performed on the second instance of the DU 430 that is maintained on the cellular device, while the user is able to carry on with normal cellular operations on the first instance of the DU 430 that is maintained on the cellular device. In this embodiment, the second instance of the DU 430 that is maintained on the cellular device may be loaded with all data necessary to maintain current communication on the site. When ready, the system then merely swaps the active instance (i.e., the first instance of the legacy software with the second instance of the updated software), thereby minimizing downtime without having to offload traffic to different site. The underlying hardware in the cloud supports both software instances, since the software has been disaggregated from the hardware. The instances of the software run on top of the underlying hardware in the cloud using the system infrastructure. A user is then able to switch back and forth between the instances as needed.

Regarding this switch between instances, in one embodiment these two RAN instances are in an Active-Active state, with smooth failover transition when failure is detected. In another embodiment, these two RAN instances are in an Active-Standby state, with smooth failover transition when failure is detected. Accordingly, the first active ongoing session is handed over to the second active ongoing session (or the standby state) when the switch is initiated. This technique of utilizing two RAN instances that are both in an Active-Active state (or an Active-Standby state) has never before been implemented in an ORAN architecture.

Regarding how one of the instances is defined as active, in one embodiment Session management software is used to define the active instance. The underlying infrastructure knows which instance is currently active, since the underlying infrastructure has to know where to send the packets. In either the active-standby implementation or active-active implementation, there is a flagging mechanism that dictates which instance of the two instances is active. In some embodiments, both instances are designated as active. In such an embodiment, the packets and/or communications are then sent in a round-robin mechanism or other method with priority methods and/or weighting methods. For example, in one embodiment in which both instances are designated as active, one route or instance is given 70% of the packets/load/traffic and the other route or instance is given the remaining 30% of the packets/load/traffic. In some embodiments like the above-described 70/30 embodiment, hardware resources (e.g., memory or compute allocation) may be imbalanced between the two instances.

In one or more such embodiments, the two instances are managed by a control agent. For example, a Control Unit-Control Plane (CU-CP) can be the control agent that manages the two instances. In another embodiment, a different main control in the Distributed Unit (DU) side, which resides in the remote DU hardware, manages the two instances.

Legacy cellular telecommunications equipment is not able to run two instances of software concurrently on the same hardware, with the first instance running on a first subset of the core processors in the cloud, while the first instance is maintained on the cellular device, and the second instance running on a second and distinct subset of the core processors in the cloud and maintained, while the second instance is maintained on the cellular device.

In one or more embodiments of the system for implementing parallel software instances in Open Radio Access Network (O-RAN) in a cellular network, the first instance is a first version of software (e.g., Version 1.0) from a first vendor and the second instance is a second version of the software (e.g., Version 2.0) from the same first vendor. In another embodiment, the first instance is a first software from a first vendor and the second instance is a second software from a second vendor, that is different from the first vendor. Thus, there is no cellular equipment down-time experienced when switching between software from different vendors, or when switching between legacy software from a first vendor and updated software from the same first vendor. Further, in still another embodiment, the first instance is a first virtual machine and the second instance is a second virtual machine. In such embodiments, the first instance is separate and distinct from the second instance (e.g., the first instance and the second instance may be different versions). In such an embodiment, the user is able to switch back and forth between the virtual machines as needed.

In some embodiments of the system for implementing parallel software instances in O-RAN in a cellular network, the first instance is a 5G operating platform and the second instance is a 6G operating platform. Accordingly, a user device that is employing the system for implementing parallel software instances in O-RAN in a cellular network may act as both a 5G device and a 6G device. This configuration overcomes the technological problem of having user device that needs to be able to operate in a 5G network at some times and operate in a 5G network at other times. Additionally, such a user device that is employing the system for implementing parallel software instances in O-RAN in a cellular network may be employed when the user is operating in a 5G network environment in anticipation of an imminent 6G. In this manner, a user may employ a 5G operable user device that is "future proofed" for an upcoming 6G rollout in the future. Notably, the system for implementing parallel software instances in O-RAN in a cellular network may be used in either a public cloud or a private cloud.

Referring now to other embodiments of a system for implementing parallel software instances in O-RAN in a cellular network, in some such embodiments the first instance is a virtual machine and the second instance is an edge computing platform. Edge computing has numerous advantages, such as being able to bring large qualities of highest desirable and frequency used data to "the edge", i.e., near the end user, instead of much farther away in various cloud servers. This results in technological benefits such as faster response times (i.e., lower latency), better security (due to lower amounts of sensitive data being sent transmitted over the Internet), and reduced network congestion (due to more localized data storage). However, in previous systems edge computing has not been able to be implemented in cellular telecom networks and devices.

Embodiments of the system for implementing parallel software instances in O-RAN in a cellular network are able to merge edge computing to the Distributed Unit (DU) 420 of a Radio Access Network (RAN) in a cellular telecommunications network, e.g., with a first instance being a virtual machine and the second instance being an edge computing platform. In such embodiments, known highly desirable content (e.g., new 4K movie releases) may be sent to the "edge" in cellular network for use by cellular end devices (i.e., User Equipment). In one or more embodiments, the system either performs analytic calculations to determine which high-resolution videos and/or other large data content is in high demand or accesses these analytic calculations from third parties. In this manner, these high-resolution videos and/or other large data content may be pre-downloaded to the edge and then accessed by users of the system for implementing parallel software instances in O-RAN in a cellular network. Transfer of these large files across the internet would not be necessary, thereby providing both efficiency and security benefits. These embodiments of the system are cloud native, with multiple parallel software applications running on the same hardware.

Figure 6:
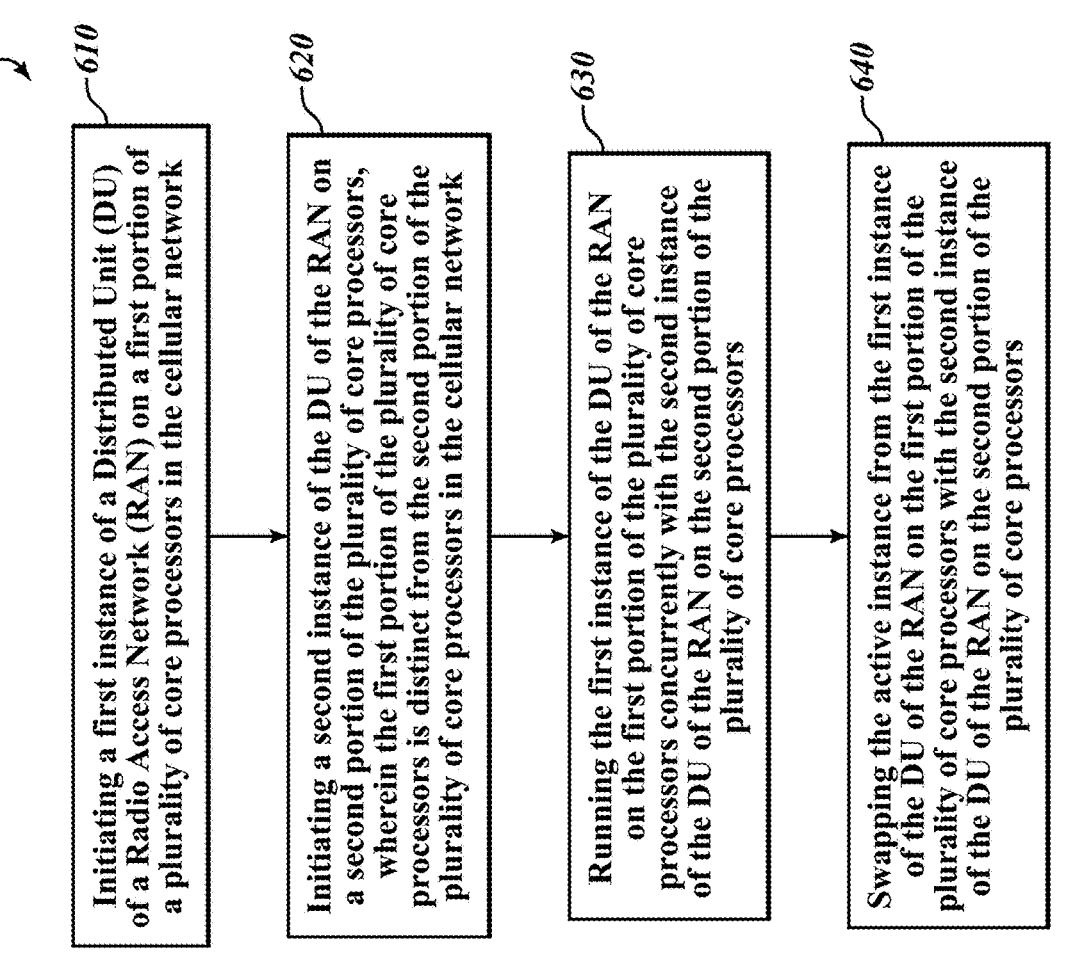
FIG. 6 is a logic diagram showing a method for implementing parallel software instances in O-RAN in a cellular network.

FIG. 6 is a logic diagram showing a method 600 for implementing parallel software instances in Open Radio Access Network (O-RAN) with disaggregated hardware and software in a cellular network. This schedule method may be implemented as a 5G architecture, such as has been shown in FIGS. 1-3 as described above. As shown in FIG. 6, at operation 610, the method includes initiating a first instance of a Distributed Unit (DU) of a Radio Access Network (RAN) on a first portion of a plurality of core processors in the cellular network. At operation 620, the method includes initiating a second instance of the DU of the RAN on a second portion of the plurality of core processors, wherein the first portion of the plurality of core processors is distinct from the second portion of the plurality of core processors in the cellular network. At operation 630, the method includes running the first instance of the DU of the RAN on the first portion of the plurality of core processors concurrently with the second instance of the DU of the RAN on the second portion of the plurality of core processors. At operation 640, the method includes swapping the active instance from the first instance of the DU of the RAN on the first portion of the plurality of core processors with the second instance of the DU of the RAN on the second portion of the plurality of core processors.

Figure 7:
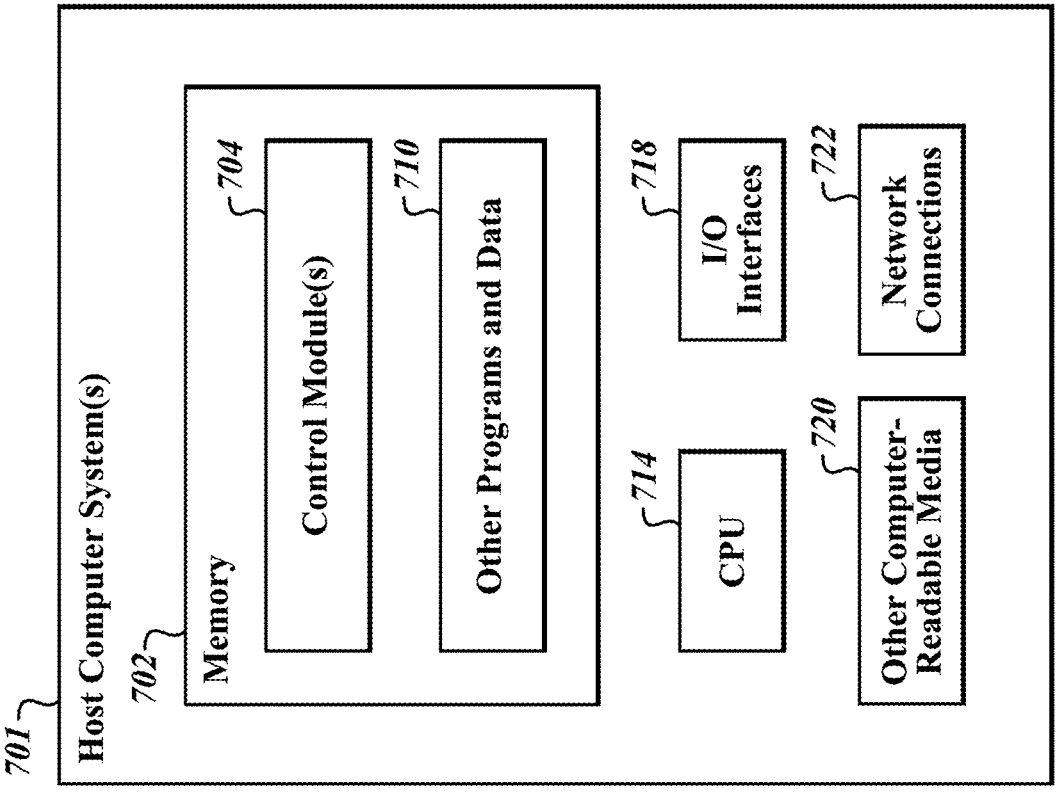
FIG. 7 shows a system diagram that describes an example implementation of a computing system(s) for implementing embodiments described herein.

FIG. 7 shows a system diagram that describes an example implementation of a computing system(s) for implementing embodiments described herein. The functionality described herein for a system for a method for implementing parallel software instances in O-RAN in a cellular network can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. This proactive scheduling system may be implemented as a 5G architecture, such as has been shown in FIGS. 1-3 as described above.

In particular, shown is example host computer system(s) 701. For example, such computer system(s) 701 may represent those in various data centers and gNBs shown and/or described herein that host the functions, components, microservices and other aspects described herein to implement a method for implementing parallel software instances in O-RAN in a cellular network. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for a method for implementing parallel software instances in O-RAN in a cellular network. Memory 702 may also store other programs and data 710, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, and the like.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interface, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for implementing parallel software instances in Open Radio Access Network (O-RAN) with disaggregated hardware and software in a cellular network, the method comprising:

providing, by a mobile network operator, a distributed unit (DU) of a cellular telecommunication network radio access network (RAN) that is served by a cellular site base station, wherein the DU is in operable communication with a corresponding primary central unit control plane (CU-CP) of a primary centralized unit (CU) that is hosted on a cloud-native virtualized compute instance;

initiating a first instance of the DU of the RAN on a first portion of a plurality of core processors in the cellular network;

initiating a second instance of the DU of the RAN on a second portion of the plurality of core processors, wherein the first portion of the plurality of core processors is distinct from the second portion of the plurality of core processors in the cellular network;

running the first instance of the DU of the RAN on the first portion of the plurality of core processors while concurrently running the second instance of the DU of the RAN on the second portion of the plurality of core processors, wherein the first portion of the plurality of core processors is distinct from the second portion of the plurality of core processors; and swapping an active instance from the first instance of the DU of the RAN on the first portion of the plurality of core processors with the second instance of the DU of the RAN on the second portion of the plurality of core processors.

2. The method of claim 1, wherein the first instance is a first operating system and the second instance is a second operating system.

3. The method of claim 1, wherein the first instance is a first version of software from a first vendor and the second instance is a second version of the software from the same first vendor.

4. The method of claim 1, wherein the first instance is a first software from a first vendor and the second instance is a second software from a second vendor.

5. The method of claim 1, wherein the first instance is a 5G cellular network operating system and the second instance is a 6G cellular network operating system.

6. The method of claim 1, wherein the first instance is a first virtual machine and the second instance is a second virtual machine.

7. The method of claim 1, wherein the first instance is a Windows operating system and the second instance is a Linux operating system.

8. The method of claim 1, wherein the first instance is a virtual machine and the second instance is an edge computing platform.

9. A system for implementing parallel software instances in Open Radio Access Network (O-RAN) with disaggregated hardware and software in a cellular network, the system comprising:

a memory that stores computer-executable instructions; and a processor that executes the computer-executable instructions and causes the processor to:

initiate a first instance of a Distributed Unit (DU) of a Radio Access Network (RAN) on a first portion of a plurality of core processors in the cellular network;

initiate a second instance of the DU of the RAN on a second portion of the plurality of core processors, wherein the first portion of the plurality of core processors is distinct from the second portion of the plurality of core processors in the cellular network;

run the first instance of the DU of the RAN on the first portion of the plurality of core processors concurrently with the second instance of the DU of the RAN on the second portion of the plurality of core processors; and swap an active instance from the first instance of the DU of the RAN on the first portion of the plurality of core processors with the second instance of the DU of the RAN on the second portion of the plurality of core processors.

10. The system of claim 9, wherein the first instance is a first operating system and the second instance is a second operating system.

11. The system of claim 9, wherein the first instance is a first version of a software from a first vendor and the second instance is a second version of the software from the same first vendor.

12. The system of claim 9, wherein the first instance is a first software from a first vendor and the second instance is a second software from a second vendor.

13. The system of claim 9, wherein the first instance is a 5G cellular network operating system and the second instance is a 6G cellular network operating system.

14. The system of claim 9, wherein the first instance is a first virtual machine and the second instance is a second virtual machine.

15. The system of claim 9, wherein the first instance is a Windows operating system and the second instance is a Linux operating system.

16. The system of claim 9, wherein the first instance is a virtual machine and the second instance is an edge computing platform.

17. A system for implementing parallel software instances in a cellular component using Open Radio Access Network (O-RAN), the system comprising:

a memory that stores computer-executable instructions; and a processor that executes the computer-executable instructions and causes the processor to:

enable initiation of a first instance of a Distributed Unit (DU) of a RAN on a first portion of a plurality of core processors in a cellular network;

enable initiation of a second instance of the DU of the RAN on a second portion of the plurality of core processors, wherein the first portion of the plurality of core processors is distinct from the second portion of the plurality of core processors in the cellular network;

execute the first instance of the DU of the RAN on the first portion of the plurality of core processors concurrently with the second instance of the DU of the RAN on the second portion of the plurality of core processors; and swap an active instance of the first instance of the DU of the RAN on the first portion of the plurality of core processors, and with the second instance of the DU of the RAN on the second portion of the plurality of core processors.

18. The system of claim 17, wherein the first instance is a first version of a software from a first vendor and the second instance is a second version of the software from the same first vendor.

19. The system of claim 17, wherein the first instance is a 5G cellular network operating system and the second instance is a 6G cellular network operating system.

20. The system of claim 17, wherein the first instance is a virtual machine and the second instance is an edge computing platform.

* * * * *